Nov. 22, 1949  G. LAUBE  2,488,820
AUTOMATIC STOP MOTION DEVICE
Filed Dec. 3, 1945

INVENTOR
Grover Laube

BY *Robt. L. Dunn*
ATTORNEY

Patented Nov. 22, 1949

2,488,820

UNITED STATES PATENT OFFICE 2,488,820

AUTOMATIC STOP MOTION DEVICE

Grover Laube, Los Angeles, Calif., assignor to Twentieth Century-Fox Film Corporation, Los Angeles, Calif., a corporation of New York Application December 3, 1945, Serial No. 632,499

4 Claims. (Cl. 74—112)

This invention relates to power transmitting devices and deals particularly with a device whereby a cycle of power may be transmitted from a driver to a driven member.

The invention to be described hereinafter has been developed in connection with a motion picture camera for the purpose of providing a means whereby the camera may be moved one cycle, for example, one frame of film, and automatically stopped in position for the beginning of another cycle. However, it will become apparent to those versed in the art that a device of this character will find usefulness in other fields wherever power is intermittently applied for driving various devices.

In its preferred form, my invention performs more or less the function of a clutch, in that the driven member may be engaged with the driver by manual means and is then automatically disengaged at a given point. Accordingly, it becomes the primary object of this invention to provide a device whereby power may be optionally transmitted from a driver to a driven member, which device automatically disconnects the power at the end of a predetermined cycle.

In motion picture work particularly, it is essential that each cycle starts and ends at precisely the same point which corresponds with the movement of the film from frame to frame. Another object of this invention is, therefore, to provide registration means in conjunction with the stop motion means in a device of the character described whereby each cycle is started and ended at precisely the same point.

Still another object is the provision of means in a device of the character described whereby an operator may optionally engage said device at any time and the device will automatically disengage itself at the completion of one cycle.

Other objects and advantages will become apparent as the description proceeds in conjunction with the drawings in which.

Figure 1:
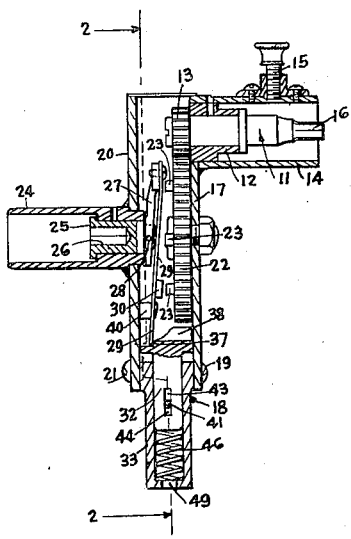
Figure 1 is a section partly in elevation on line I—I of Figure 2 showing the engaging points held in a retracted position for disengagement of the clutch.

Referring to the drawings, it will be seen that I have illustrated my invention as a device adapted to be interposed between a driving member and a driven member, neither of which is shown. The device is equipped with a member 11 having means on the end thereof adapted to be engaged by any suitable member on the driver. The member 11 thus becomes a driving member in so far as the device is concerned. It in turn is rotatably mounted in a bearing 12 and is equipped on the inner end with a gear 13 suitably attached thereto. The whole assembly may be encased in a sleeve 14 which carries a screw threaded member 15 adapted to be screwed inwardly to hold a coupling member on a driver, not shown, in engagement with the square end 16 of the member 11. As shown, the sleeve 14 is suitably mounted upon a plate 17, which in turn is mounted upon a T-shaped member 18 by means of screws 19. On the opposite side of the T-shaped member 18, I mount another plate 20 in a similar manner by screws 21. These two plates form a housing and a support for the mechanism of my device. Meshing with the gear 13, I mount a rotatable gear 22 on the plate 17. The gear 22 carries protruding pins 23 on its face. As shown, there are four of these pins, but there may be more if desired, or they may be reduced to one if found more convenient. The purpose of the plurality of pins is merely for expediting the action of the clutch in its pickup. Oppositely on the plate 20 I suitably mount another sleeve member 24 and in this member I rotatably mount a driven member 25 which carries a square recess 26 adapted to operably engage a driven member upon the device to be driven. On the inner end of the member 25 I mount an arm 27 which is arranged to rotate with the member 25 and is held thereon by means of a pin 28. The arm 27 carries a flat leaf spring 29 which is rigidly attached thereto at the outer end with the spring extending across the face of the gear 22 and carrying a fixed lug 30 adapted to engage any one of the pins 23 upon rotation of the gear 22 when the spring is not held in a retracted position.

Figure 3:
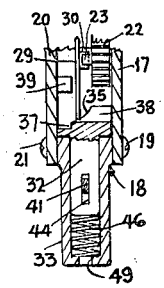
Figure 3 is a fragmentary view of the lower part of Figure 1 showing the position of the parts when released for engagement of the clutch.
Figure 5:
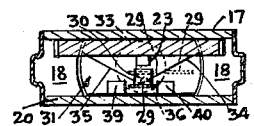
Figure 5 is a view taken on line 5—5 of Figure 2.

The means for holding the spring 29 in a retracted position comprise a specially shaped movable detent member generally designated 31. This member will be seen to comprise a small shaft 32 adapted to slidably fit in a depending cylinder 33 of the member 18. On the upper end of this shaft there is a cross member having angularly disposed faces 34 and 35 coming to a point 36. (See Figure 5.) The faces 34 and 35 coming together in the point 36 form a striking shoulder 37 (See Figures 1 and 3.) for slidably engaging and forcing the spring arm 29 into a retracted position so that the pins 23 will not engage the lug 30 when the gear 22 is rotated through the driven member 11.

Figure 4:
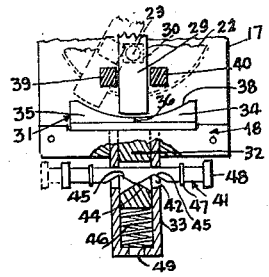
Figure 4 is a view of the lower part of Figure 2 showing the parts in the same position as Figure 3.

To engage one of the pins 23 with the lug 30, the member 31 is moved downwardly slightly in the depending cylinder 33 of the member 18 until the lower end of the spring 29 disengages the shoulder 37. The arm 29 is then allowed to spring inwardly and assumes the position shown in Figure 3. It is then in position for one of the pins 23 to engage the lug 30. It will also be noted by referring to Figures 3 and 4 that the arm 29 is free to turn with the gear 22, since the faces 34 and 35 terminate upwardly in a curved surface 38 that has substantially the same radius as the arm. Accordingly, the end of the arm will slide over this surface as the arm swings in its rotation since the member 31 was only temporarily depressed and the spring 46 normally urges the member 31 upwardly into a position whereby the shoulders 34 and 35 are in an arm engaging position. As soon as the arm clears the surface 38 in either direction, the member 31 will snap upwardly into its normal position. Also, it will be observed that as the arm 29 was released by the detent arrangement and snapped forwardly it cleared the ends of the spaced pins 39 and 40 which are mounted on the plate 20 and adapted to engage opposite sides of the arm. These pins form the means for registering the arm for the beginning and ending of the cycle.

The means for lowering the member 31 may take a variety of forms, the only requirement being that the member is temporarily lowered sufficiently to allow the spring 29 to snap into a free position and is then raised so that either the face 34 or 35, depending on which way the arm is rotating, will form a striking surface for the arm at the completion of its revolution and will force it into a retracted position between the pins 39 and 40, whereby the motion is stopped and the arm is held in exact registration with the same point at which the cycle started.

Figure 2:
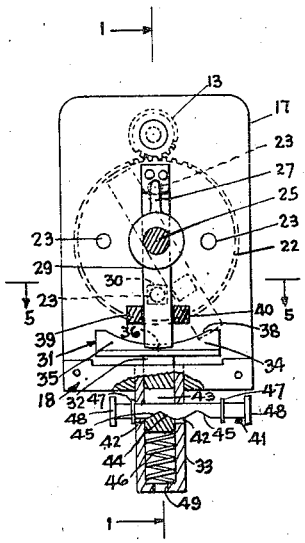
Figure 2 is a view taken on line 2—2 of Figure 1.

In operation the device is used, as before stated, in motion picture work, to move film in a motion picture camera a single frame at a time. This is accomplished by the operator pressing a slid lever generally designated 41. This lever is mounted in slots 42 in the wall of the cylinder 33 and works through another slot 43 in the shaft 32. As shown, the slot 43 clears the top of the lever but is formed with a V-shaped lower shoulder designated 44. This shoulder is adapted to fit in V-shaped cuts 45 in the lever 41. Accordingly, as the lever is pushed through the slot 42 from the position shown in Figure 2, it will force the shaft 32 downwardly in the member 18, thus carrying the T-shaped head of the member down with it and allowing the spring 29 to snap into a position where one of the pins 23 can engage the lug 30. But, as the lever 41 is pushed on through the slot or is retracted, the shaft 31 will snap back into its original position under the influence of a spring 46 and again be in a position to engage the arm on one of the faces 34 or 35 and force it into a retracted position. Stop members 47 may be used in connection with the lever 41 if desired so that the lever will be held in definite positions with respect to the position of member 41, and also push button members 48 may be used on each end of the member if desired. A small hole 49 in the member 18 may also be included to provide a means of air escaping from the cylinder 33. By operating the lever 41 in the above mentioned manner, the device may be used to drive a mechanism for one predetermined cycle.

I claim:

1. In a device of the character described, a drive means, a driven member, said drive means including a rotatable member, protruding pins on said rotatable member, a resilient arm radially mounted on said driven member having pin engaging means thereon adapted to be normally disposed in the path of said protruding pins, means for releasably holding said pin engaging means on said arm out of said pin path, and fixed registration pins adapted to engage said arm and hold the same against rotation when out of engagement with said protruding pins.

2. In a device of the character described, a drive means, a driven member, said drive means including a rotatable member, protruding pins on said rotatable member, a resilient arm radially mounted on said driven member having pin engaging means thereon adapted to be normally disposed in the path of said protruding pins, and a detent member having a pair of shoulders angularly arranged to form an apex thereon, said detent member being disposed in the path of movement of said arm to place one of said shoulders in an arm engaging position regardless of the direction of the rotation of said arm and force the same out of a pin engaging position upon rotation of said arm.

3. In a device of the character described, a drive means, a driven member, said drive means including a rotatable member, protruding pins on said rotatable member, a resilient member mounted on said driven member having pin engaging means thereon adapted to be normally disposed in the path of said protruding pins, means for releasably holding said pin engaging means on said resilient member out of said pin path, and fixed registration pins adapted to engage said resilient member and hold the same against rotation when out of engagement with said protruding pins.

4. In a device of the character described, a drive means, a driven member, said drive means including a rotatable member, protruding pins on said rotatable member, a resilient member mounted on said driven member having pin engaging means thereon adapted to be normally disposed in the path of said protruding pins, and a detent member having a pair of shoulders angularly arranged to form an apex thereon, said detent member being disposed in the path of movement of said resilient member to place one of said shoulders in a resilient member engaging position regardless of the direction of the rotation of said resilient member and force the same out of a pin engaging position upon rotation of said driven member.

GROVER LAUBE.

REFERENCES CITED

The following references are of record in the file of this patent:

UNITED STATES PATENTS

| Number | Name | Date |
|---|---|---|
| 713,039 | Graham | Nov. 4, 1902 |
| 980,887 | Norton | Jan. 3, 1911 |